Sept. 12, 1967 J. F. GIFFORD 3,341,725
ELECTRIC MOTOR HAVING A NUTATIVE ELEMENT
Filed July 15, 1965 8 Sheets-Sheet 1

INVENTOR.
JOHN F. GIFFORD
BY
ATTORNEY

INVENTOR.
JOHN F. GIFFORD
BY
ATTORNEY

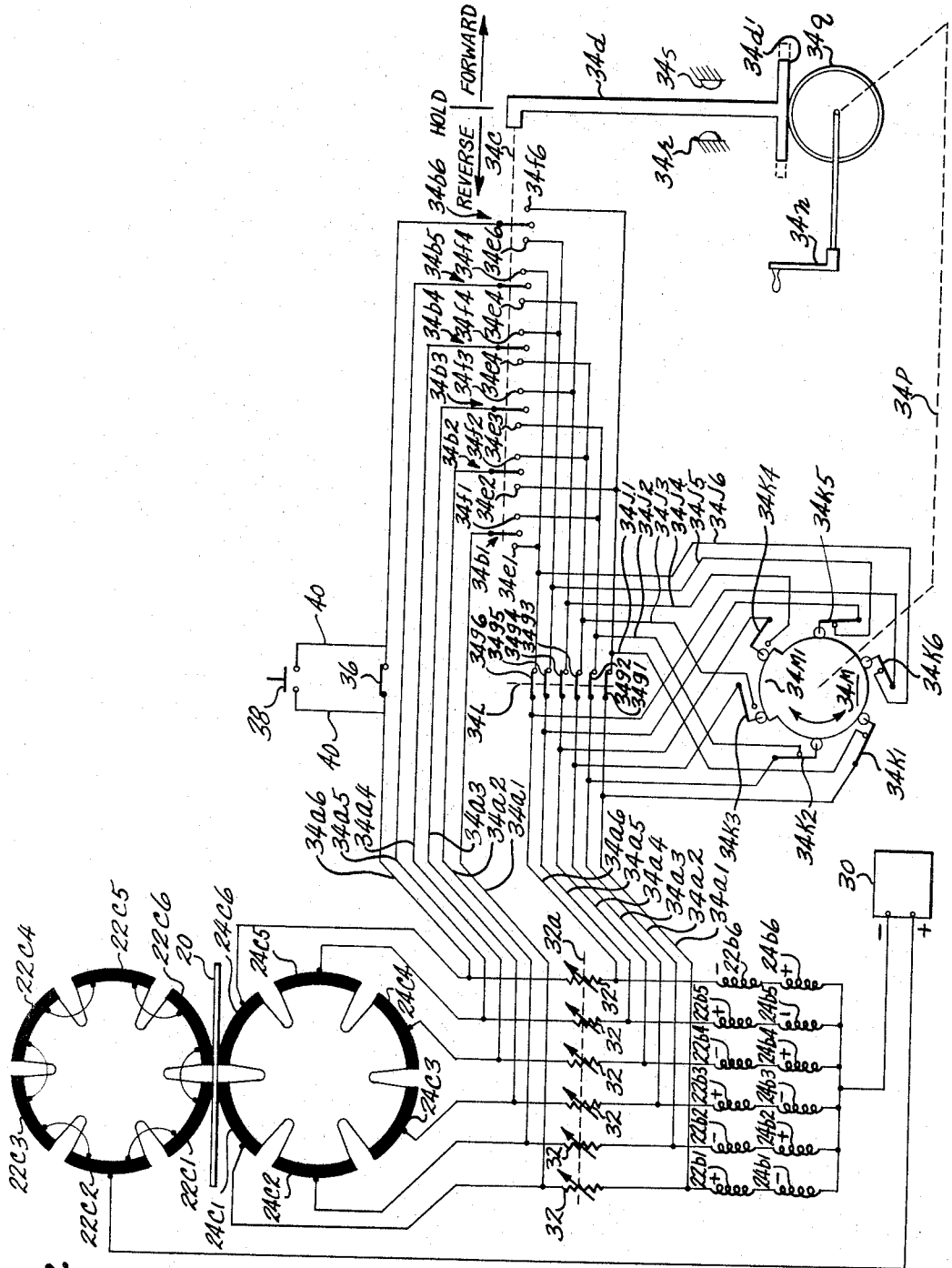

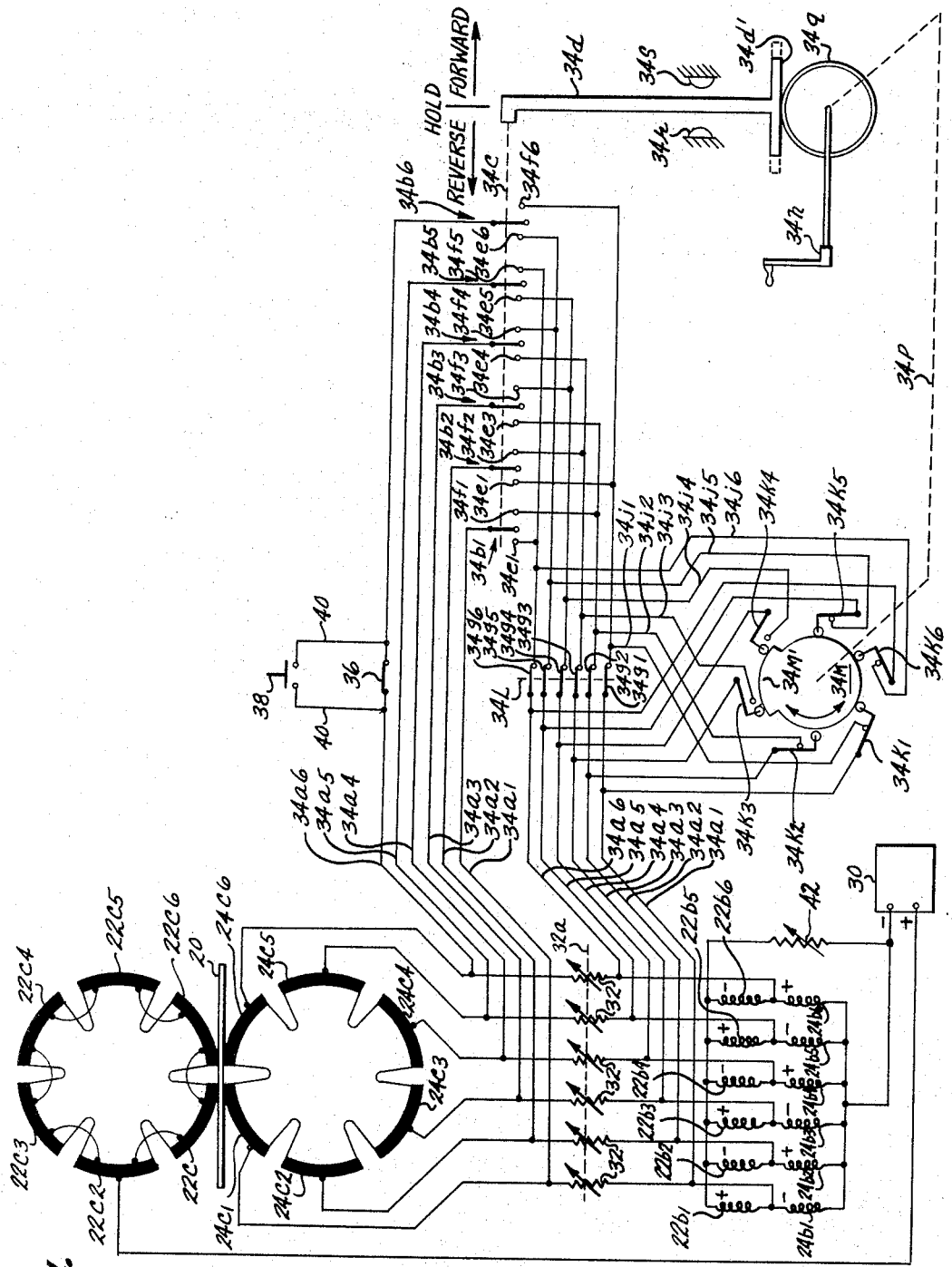

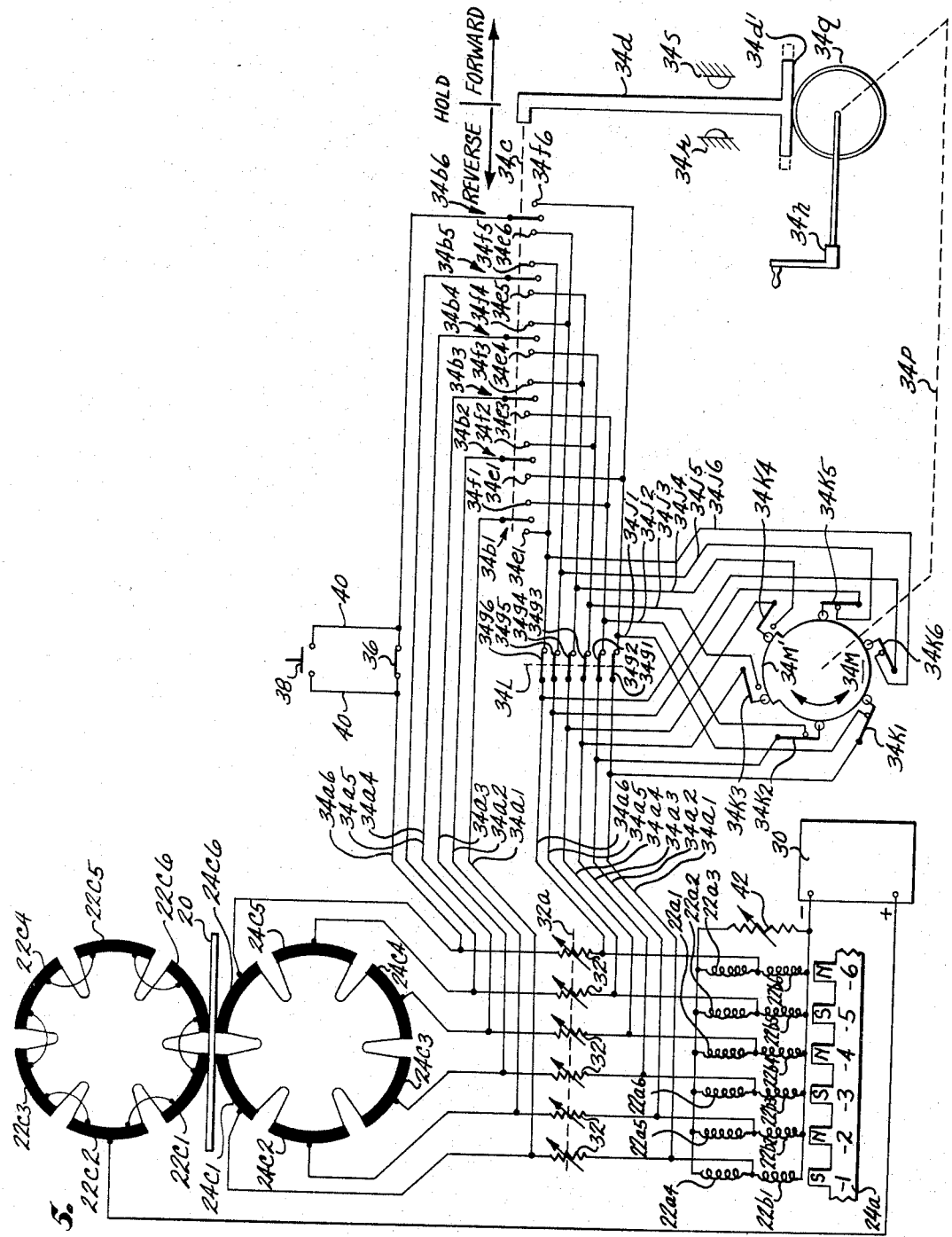

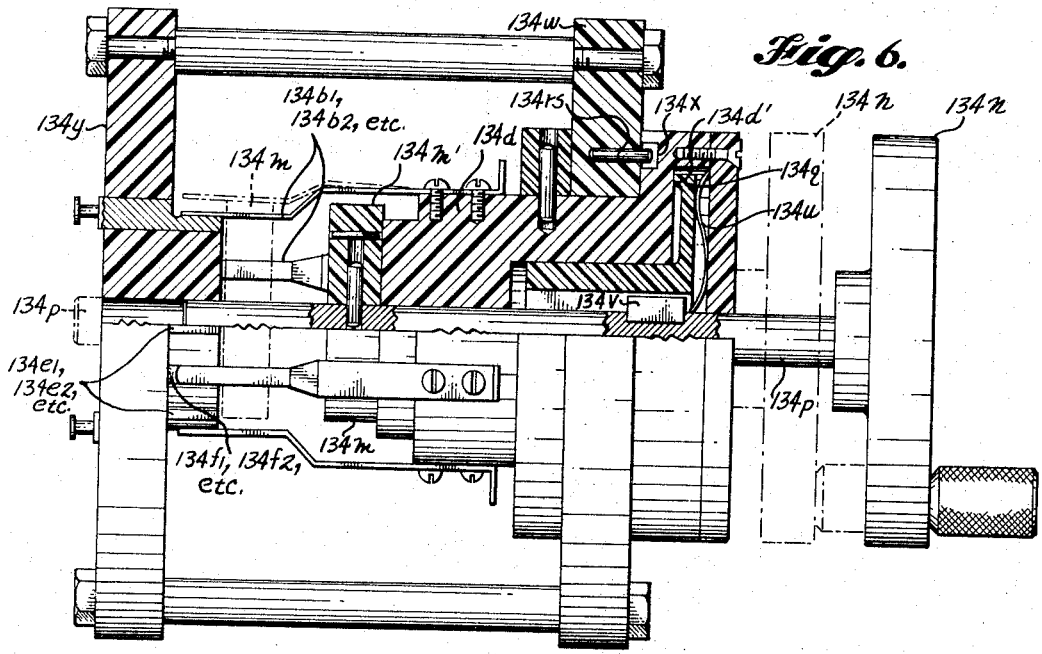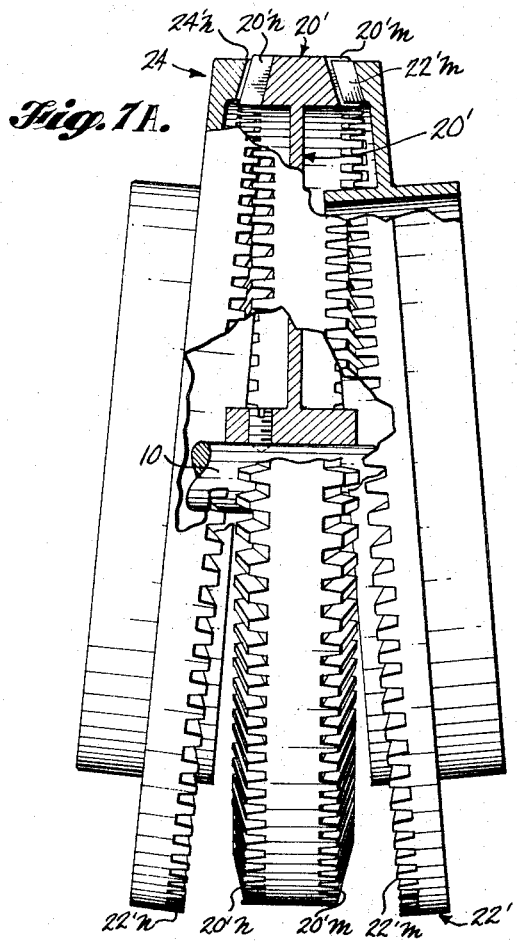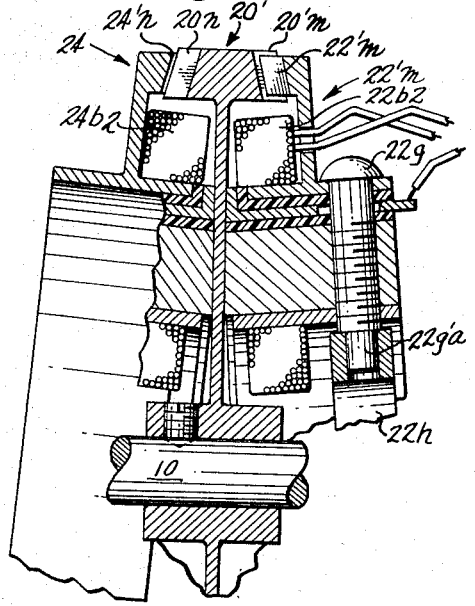

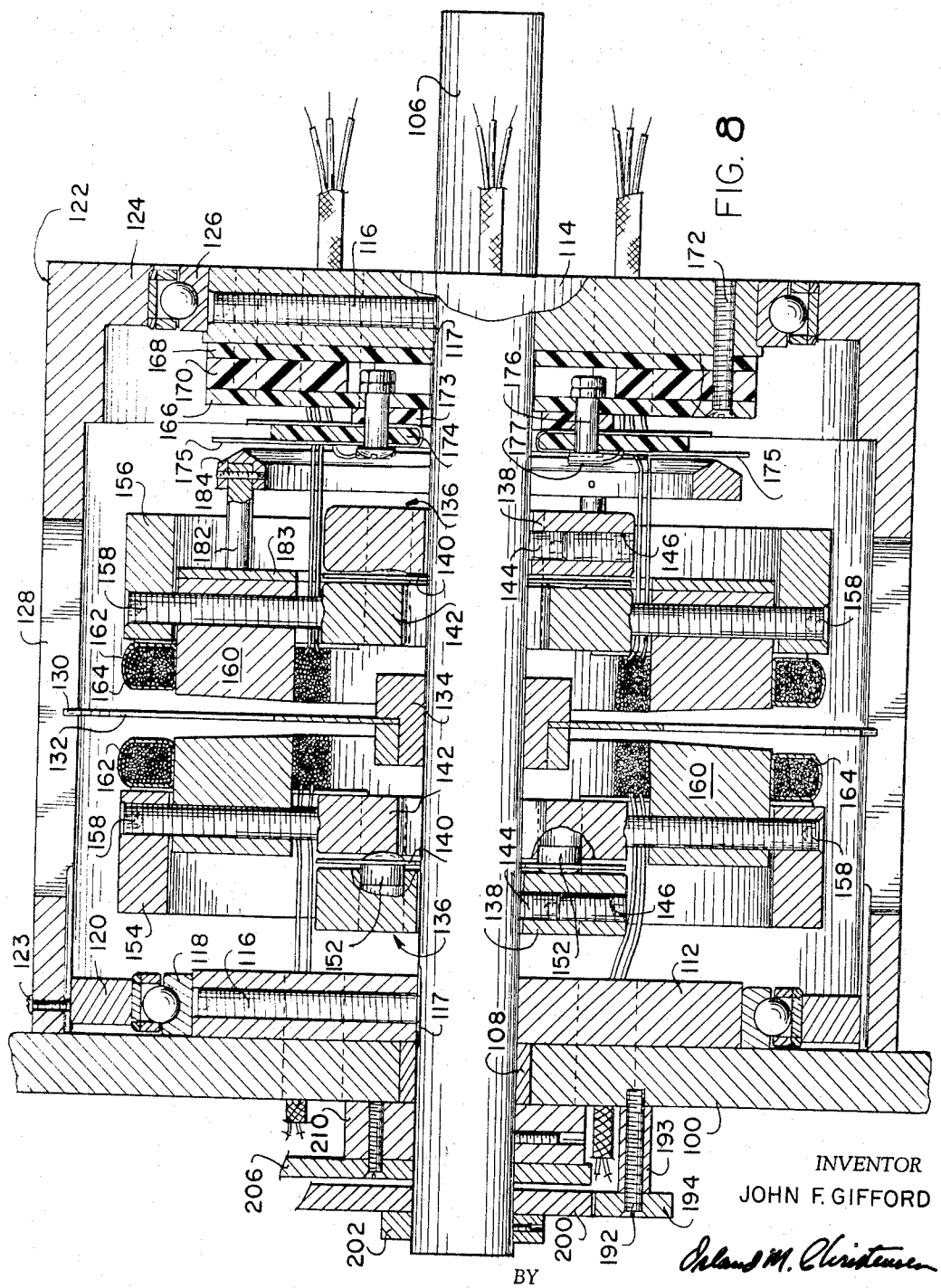

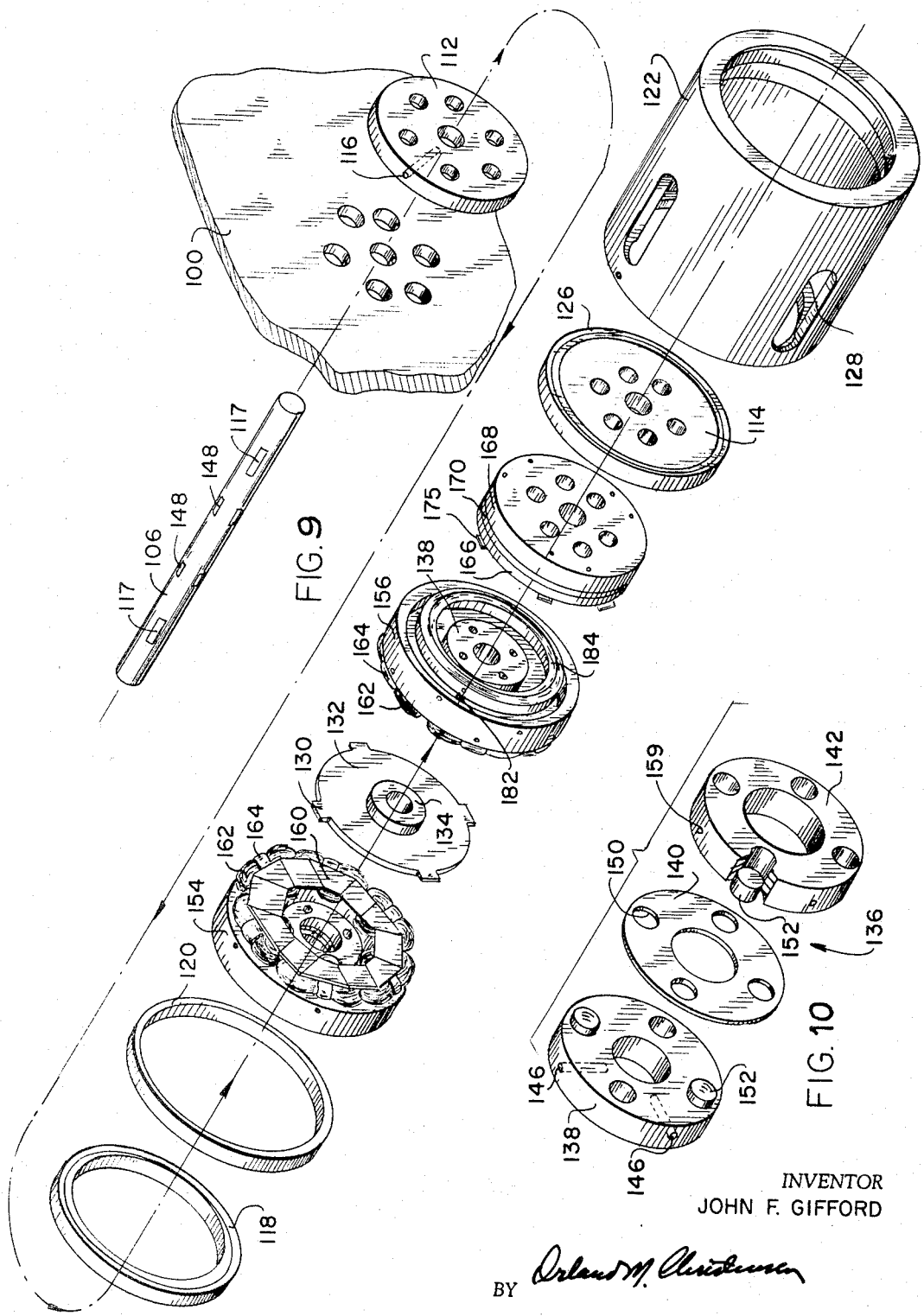

United States Patent Office 3,341,725
Patented Sept. 12, 1967

3,341,725
ELECTRIC MOTOR HAVING A NUTATIVE
ELEMENT
John F. Gifford, Sandoval, N. Mex.
(P.O. Box 117, Corrales, N. Mex. 87048)
Filed July 15, 1965, Ser. No. 472,197
20 Claims. (Cl. 310—80)

ABSTRACT OF THE DISCLOSURE

The disclosed electric motor is of a nutative element type so constituted as to provide high torque-to-inertia ratio, dynamic balance, efficiency and optionally available operating characteristics. The motor is characterized by the clamping engagement of its rotor mutually between oppositely acting magnetically driven nutative stator members. The clamping point is shifted stepwise about the rotor's axis as different magnetic field windings comprised in the stator system are successively energized so as to direct the magnetic flux across the gap between stator members at magnetic pole locations which shift correspondingly about such axis. By including both stator members and the magnetic clamping force gap between them in serial relationship in magnetic circuits completed through the stator system the rotor is clamped directly between stator members with maximum force, yet the rotor itself is not required to be magnetic or ferromagnetic nor to be included necessarily in the magnetic circuits. Consequently the rotor may be made as thin as desired or of any of various forms and materials in order to impart any of selected operating characteristics to the motor.

---

This application is a continuation-in-part of my application Serial No. 350,828, filed March 10, 1964, entitled Master Slave Motor System.

The present invention relates to improvements in electric motor systems and more particularly relates to motors in which rolling contact occurs between rotor and stator members through stator nutation produced by sequential energization of stator field windings. The invention is herein illustratively described by reference to the presently preferred embodiments thereof; however, it will be recognized that certain modifications and changes therein with respect to details, may be made without departing from the essential features involved.

In prior art motors operating on the principle of nutation the stator was fixed and the rotor nutated. In that case the rotor was necessarily designed of magnetically permeable material capable of providing a low-reluctance flux return path between instantaneously energized stator poles attracting the rotor to them. For such purpose a rotor was required to be of substantial cross section, hence heavy, and as a consequence its nutative motion at appreciable speeds created considerable vibration in the motor structure. Also the rotor's mass unduly limited the motor's capability to start and stop quickly, that is, to be instantly responsive to energization changes. Such motors exhibited relatively low torque-to-inertia ratio, partly owing to the heaviness of the rotor and partly also to the limited traction developed at the one point of rolling contact between the single stator and cooperating rotor. By requiring the rotor to provide the return path for stator field flux, moreover, choice of rotor material was confined to magnetically permeable materials, which further limited the available design parameters by which to achive selected operating characteristics. Another limitation of such prior art motors was the lack of any provision for readily holding the rotor in stationary position against load reaction torque during periods when the stator was not being energized by driving currents.

A broad object of this invention is to provide an improved nutation type motor overcoming the aforementioned problems and limitations of prior art devices.

A more specific object is to provide a high-torque motor, and more particularly one having a relatively high torque-to-inertia ratio.

A related object is to provide a motor wherein the rotor may be of relatively thin cross section, so that even if it is required to be traversed by magnetic field flux in some applications its interpositioning between stators will not impair the performance characteristics. In fact it is an object to provide a motor of versatile qualities wherein choice of rotor material is not confined to magnetically permeable materials, but may include nonmagnetic, conductive or nonconductive materials if desired, so as to impart different operating characteristics to the motor. For example, the rotor may be made of a highly conductive material so as to provide dampening by the "shorted turn" effect. Alternatively it may be of magnetically permeable material segmented or laminated so as to interrupt current paths therein and thereby enhance magnetic gripping action of the synchronous stators thereon without attendant dampening of the motor's response characteristic.

Another specific object hereof is to provide such a motor which may inherently function as a brake or a clutch, with or without allowance for slippage; or a motor system which achieves the same result by stator energizing circuit arrangements.

A further important object hereof is to provide such a motor of high efficiency without sacrifice of the aforementioned objectives.

A further object is to provide a motor system in which substantially all stator field windings are worked throughout the nutation cycle so as to maximize gripping action.

Still another object is to provide an improved motor of the described type having long and trouble-free commutator life by substantially eliminating or greatly reducing the usual causes of commutator wear and erosion, namely sliding friction and local heating due to excessive sparking at the contacts at the instant of break.

A further object is to devise an improved motor which may be operated in any of a wide variety of capacities including a continuous rotating drive, a stepping drive, an intermittent drive and brake device, a slipping clutch, and index-homing device, a master-slave motor system component, etc.

In achieving these and related objectives the improved motor system employs two opposed stators which clampingly engage the rotor between them by magnetizing flux paths in both stators serially with the clamping zone where they rotate nutatively on the rotor. Preferably by successive energization of electromagnetic windings the two stators nutate synchronously in step-wise rolling contact with corresponding points on opposite sides of the rotor. With two stators, the rotor may be of thin cross section, so that even if it is interposed in the magnetic path through the stators, it may be made of either permeable or non-permeable material without unduly increasing the magnetizing force required to operate the motor. In one embodiment commutator segments connected to the stator windings are in circumferential registry with the stator poles and move nutatively with the associated stator so as to make electrical contact successively with opposing commutator means as the stators advance, and thereby to hold the stators in each new position, or to cause further advance, depending upon control switching in the stator energizing circuit.

An important advantage of oppositely but synchronously nutated stators lies in the mutual nullification of their nutation acceleration forces so as to minimize motor vibrations; in fact, it is theoretically possible when the stators have equal moments of inertia and equal stroke or displacement in nutation to completely eliminate stator reaction vibrations at all speeds.

A further feature of the improved motor is the use of a relatively thin disk-like rotor configuration, with a low moment of inertia and which need not be a part of the magnetic circuit of the stator. Accordingly, responsiveness of the motor to starting and stopping commands is greatly enhanced and opportunities are opened for designing the rotor of any selected material, whether or not magnetically permeable, in order to achieve selected operating characteristics.

Still another feature resides in a motor system with an at-rest rotor holding function achieved by a stator energizing circuit including alternative energizing paths for the stator so as to provide reduced winding energization with minimum heating and energy loss in the periods between driving energization. Alternatively or in addition, if desired, permanent magnets are incorporated in a stator field structure and operable to clamp the rotor in stationary position automatically during periods between driving energization of stators.

Still another feature resides in the use of a toroidal stator magnetic structure with salient poles and with the pole windings so energized as to store a maximum proportion of the total field flux in the total stator structure at all times, the flux pattern shifting as necessary to cause stator nutation but the flux not being required to reverse directions. More specifically the arrangements are such that the stator poles are energized in pairs so that in each of the successively advanced positions of the stators in their nutation cycle two poles of one stator will be magnetized in a magnetic couple cooperating with the opposing stator, and if the opposing stator has corresponding field windings, the associated two field windings on that stator will also be simultaneously energized so as to provide a four-pole couple holding the rotor pinched between stators. Moreover each pole of a stator is always energized with the same magnetic polarity. As a result of these provisions efficiency is maximized by the avoidance of flux reversals in the field structure and commutator arcing voltages are likewise minimized, prolonging commutator life. Moreover, great traction force and torque are developed with minimum expenditure of energy.

Still another feature resides in such an electric motor system having commutator means and associated stator energizing circuit connections by which stator field windings which are not instantly being energized to attract the opposing stator poles are being energized to produce magnetic repulsion on the side of the stator axis opposite the attraction side, thereby adding to the rotor clamping force and to the torque produced.

Still another feature is to provide a set of gear teeth in the circular zone of rolling contact on at least one stator and a cooperating set on the rotor, thereby assuring positive index positioning of the members on recurring cycles of nutation of the stators. Due to the clamping action of the synchronously nutative stators pinching the rotor between them, gear teeth of ordinary design may be employed without danger of their becoming disengaged, even though the rotor and stator members structurally may be made somewhat flexible if desired in order to minimize mass and moment of inertia.

These and other features, objects and advantages of the invention will become more fully evident from the following description thereof by reference to the accompanying drawings.

FIGURE 3 is a schematic wiring diagram in which the commutator segments are shown arbitrarily in the plane of the paper, and stator windings are interconnected in a circuit providing reversible drive and holding control switching as well as index-homing switching.

FIGURE 4 is a schematic wiring diagram similar to FIGURE 3 but with the stator windings interconnected in a circuit arrangement which provides repulsion interaction between stator poles while not being magnetized for stator attraction.

FIGURE 5 is a schematic wiring diagram generally similar to FIGURE 3 but applied to a modified motor construction wherein only one of the stators is provided with electromagnetic windings and the other stator is provided with permanent magnets for load braking or holding purposes.

FIGURE 6 is a side view with parts broken away sectionally showing a combined switch mechanism suitable for controlling directional drive functions and index-homing function of such a motor.

FIGURE 7A is a simplified side view showing modified stator and cooperating rotor structures provided with gear teeth, parts being broken away to illustrate certain details; and FIGURE 7B is a fragmentary sectional view of the structure shown in FIGURE 7A but with representative stator field windings and commutator elements added.

FIGURE 8 is a longitudinal sectional view of a modified motor, the view being taken on a plane containing the motor axis.

FIGURE 9 is an exploded isometric view of the motor shown in FIGURE 8, and FIGURE 10 is an exploded isometric view of one of the stator mounting units.

Figure 1:
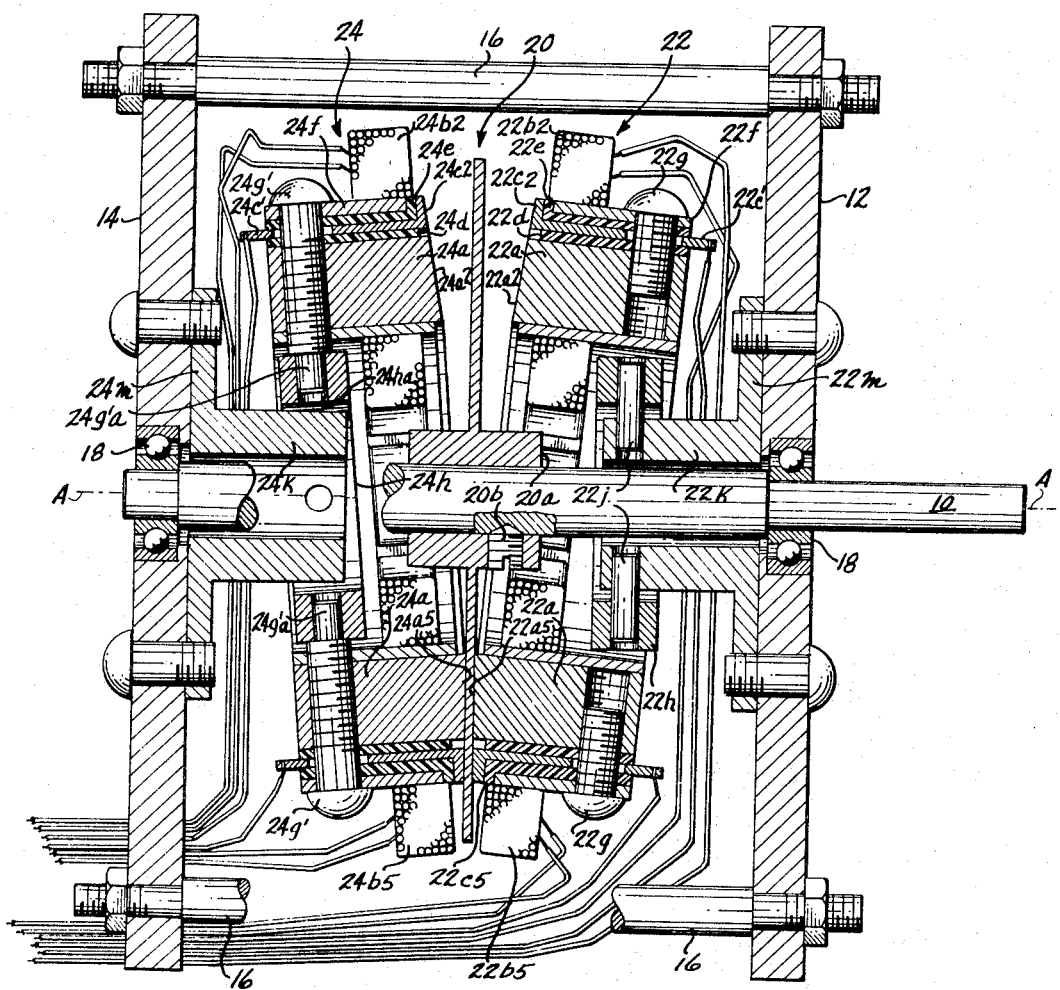
FIGURE 1 is a sectional side view taken on a plane containing the motor axis and illustrating a form of the invention in which a shaft-mounted rotor of disk configuration cooperates with synchronously nutative stators.
Figure 2:
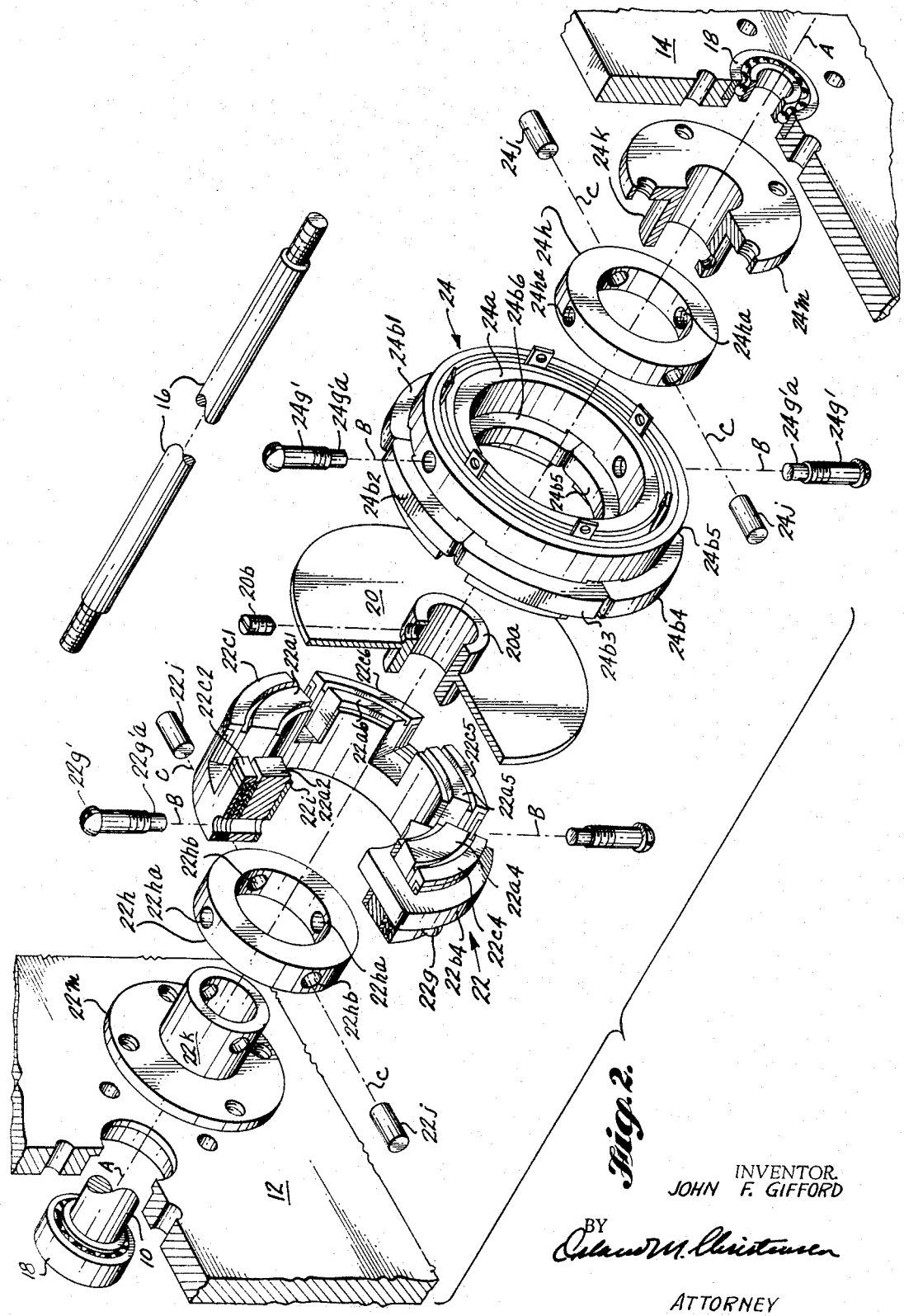
FIGURE 2 is an exploded perspective view of the same motor with certain parts omitted for simplification.

Referring to FIGURES 1, 2 and 3, motor shaft 10 is rotatively journaled in a frame structure comprising spaced end plates 12 and 14 rigidly interconnected by tie bolts 16 and centrally apertured to accommodate bearings 18 for a shaft 10. Mounted upon the shaft 10 for rotation therewith is a thin disk-shaped rotor 20 having a central hub 20a locked to the shaft by a set screw 20b. Two stators 22 and 24 are nutatively mounted on the respective end plates 12 and 14, in positions of coaxial alignment adjacent respectively opposite sides of rotor 20.

Stator 22 comprises a toroidal magnetically permeable member 22a the side of which facing rotor 20 comprises a conical surface adapted to roll in contact with the rotor's adjacent side accompanying progressive nutation of the stator, as later described. This side of the stator is relieved or notched inwardly parallel to the motor axis A—A at equal angular spacings about the axis so as to form angularly separated salient pole faces 22a1, 22a2, etc., there being six such equal slots and six such equal pole faces in the example. The number used is preferably an even number greater than four but it need not be six. The slots accommodate field windings 22b1, 22b2, etc., surrounding the respective salient poles with the coil axes directed approximately perpendicular to the respective pole faces and thereby parallel or approximately parallel to the motor axis.

Surrounding and mounted concentrically upon the magnetically permeable toroid 22a is a circular series of commutator segments 22c1, 22c2, etc., corresponding in angular extent and positioned in angular registry with the respective pole faces 22a1, 22a2, etc. These commutator segments are held in place, electrically insulated from other metal parts by an innner insulation ring 22d and an outer insulation ring 22e surrounded by a somewhat flexible clamping sleeve 22f. Clamping pressure pressing the sleeve 22f radially inward to hold the commutator segments in fixed position is established by clamp screws 22g threaded radially inward through the assembly, including the toroid 22a. Two of the clamping screws, 22g' are longer than the others and have non-threaded inwardly projecting cylindrical end portions 22g'a which are aligned on an axis B—B intersecting motor axis A—A in perpendicular relationship. These elements serve as pintles rotatively received in aligned holes 22ha formed in gimbal ring 22h. The gimbal ring is somewhat smaller than the interior of liner sleeve 22i received within toroid 22a so as to permit tilting of the toroid assembly relative to the gimbal ring 22h about axis B—B.

Tilting of the toroid assembly 22 about an axis C—C intersecting the two axes A—A and B—B in mutually perpendicular relationship is achieved by mounting the gimbal ring 22h on pintles 22j entering aligned holes 22hb formed in the gimbal ring. These latter pintles in turn are supported by a hub 22k accommodated within the gimbal ring 22h and having a mounting flange 22m which is bolted to the end plate 12. The internal diameter of gimbal ring 22h is sufficiently larger than the outside diameter of hub 22k to permit free tilting of the gimbal ring about the axis C—C. Consequently, the stator 22 is mounted to nutate about a point representing the mutual intersection of the three axes described. As such, it is free to move in rolling contact with the adjacent side of rotor 20. This center point of nutation is preferably located in the vicinity of the center of mass of stator 22 so as to minimize vibrational tendencies accompanying its nutative actuation and so that the forces required for movement of the stator nutatively in relation to the rotor remain uniform throughout the entire cycle of rolling contact therebetween.

The stator 24 is or may be constructed identical to stator 22 and requires no separate description herein except to note that corresponding parts therein have been labeled with reference sub-characters corresponding to those applied to the described parts of stator 22. The stator 24 is mounted on the end plate 14 opposite the plate 12 and in the typical case is spaced by the same distance from the adjacent side of rotor 20 as is the spacing between stator 22 and rotor 20. Since the two stators move synchronously in opposite directions while energized in rolling, driving contact with the rotor 20 dynamic balance is achieved in the motor if the nod angles of the nutating stators are equal and their polar moments of inertia in nutation are equal. If it is desired for any reason to provide one stator with a polar moment of inertia different from that of the other stator, or to provide a difference in the spacings between rotor and the respective stators, dynamic balance may still be approximated by appropriate design adjustments.

It will be evident, of course, that the ratio of the number of rotor revolutions to the number of stator nutations is governed essentially by the effective diameters of the rotor and stators at the point of rolling contact, that is by the tilt angle of the stators during nutation. The geometric principles involved are well known and it will be evident that any desired "speed-reduction" ratio may be achieved by appropriate design provisions.

Each aramature segment of stator 22 has a contact terminal projecting from the back side of the stator, as does each armature segment of the stator 24. These contact terminals are designated 22c' in the case of stator 22, and 24c' in the case of stator 24.

The commutator segments may be made of any suitable material such as beryllium-copper alloy and may be secured and insulated in position by potting compound, such as a plastic substance reinforced by fiberglass strands, as suggested by the insulation rings 22e and 22d. Likewise the same or other potting compound may be used to fill out the notches or slots between pole faces so as to provide a continuous conical rolling contact surface engageable with the adjacent side of the rotor 20. If the rotor surface is planar as in the example, the cone angle of the stator rolling contact surface is determined by the nod angle of the stator in its nutation motion.

Figure 11:
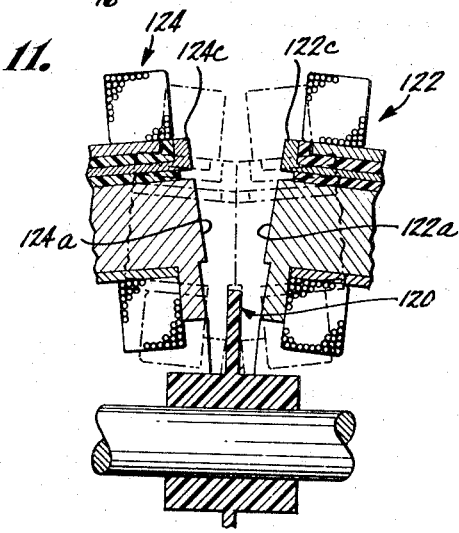
FIGURE 11 is a view of a second modified motor construction, the view corresponding to the view of FIGURE 7B.

In this embodiment rotor disk 20 is made electrically conductive so that when interposed between the opposing sets of commutator segments it will carry the necessary commutator current. If desired, it may be of magnetically permeable material serving to increase the magnetic attraction of the stators in their clamping engagement of the rotor. If desired, it may be made nonconductive, providing suitable arrangements are made to establish electrical continuity between opposing commutator segments in case they are mounted coaxially with and upon the respective stators, as in this embodiment. An example of one type of construction wherein the latter result is produced is given hereinafter (FIGURE 11). In any case, the rotor disk may be relatively thin and light in weight, its minimum acceptable thickness being determined principally by its load transmission function.

Electrical connections to the respective stator windings and to the commutator segments are made in one system as depicted in FIGURE 3. In this system embodiment the respective series of commutator segments, which in reality lie in mutually angled planes when the motor is operating, are shown arbitrarily as if they lie in a common plane perpendicular to the rotor interposed between them, and their contact terminals are omitted. Each of the commutator segments 24c1, 24c2, etc., is connected to one end of the correspondingly located opposing stator field windings 22b1, 22b2, etc. The respective opposite ends of these windings are in turn connected to one end of the corresponding opposed stator windings 24b1, 24b2, etc., and the opposite ends of the latter are commonly connected to the negative terminal of the direct voltage source 30. The positive terminal of this source is connected to all of the commutator segments 22c1, 22c2, etc., associated with stator 22. Like variable resistances 32 are interposed serially in the energizing leads for the serially connected field windings, between the respective commutator segments of stator 24 and the windings 22b1, 22b2, etc. Preferably these variable resistances are ganged together by a mechanical connection 32a so as to permit adjusting the quiescent holding current permitted to flow through the field windings.

Depending upon the voltage of source 30 and related design constants in the electromagnetic system of the motor, there will be a setting or value for resistances 32 at which the holding force by which the stators are held in clamping engagement with the rotor at the existing point of contact is just sufficient to hold the rotor against turning by a given reaction force of a load applied to the motor shaft 10. Normally this holding force will be kept at a minimum in those embodiments wherein this force continues even where the stator windings are being energized with driving current because its effect is additive with external loading in determining the motor's drive torque requirements.

In order to apply driving energization to the stator windings the control circuit shown in FIGURE 3 includes switching means for selectively bypassing different ones (or all) of the respective resistances 32. This switching means comprises the bypass conductors 34a1, 34a2, etc., in which the contactors of the respective double-throw, neutral-hold switches 34b1, 34b2, etc. are interposed, such contactors being ganged by a mechanical connection 34c operable by a three-position actuator 34d. The normal position of switches 34b is the neutral or "hold" position which is the position assumed by the actuator 34d in the absence of externally applied actuating force. One stationary contact, 34e1, of switch 34b1 is connected to the junction between stator winding 22b6 and its associated holding resistor 32; whereas the opposing stationary contact 34f1 of switch 34b1 is connected to the junction between field winding 22b2 and its associated holding resistance 32. Thus, the movable contactor of switch 34b1 is connected through conductor 34a1 to that commutator segment 24c1 which is angularly situated directly between those segments to which the stationary contacts, 34e1 and 34f1, of the same switch are connected. Therefore, when contact 34e1 is engaged (with commutator segment 24c1 energized), windings 22b6 and 24b6 will be energized to move the motor in one direction out of its holding position, whereas if the opposite contact 34f1 is engaged, windings 22b2 and 24b2 will be energized in order to move the motor in the opposite direction out of its holding position. For convenience in illustration the first contact-engaging position of the switches 34b is labeled the "reverse" drive condition and the second contact-engaging position is labeled the "forward" drive condition. Similar connectional patterns apply to the stationary contacts of the other directional control switches 34b2, 34b3, etc., and their associated stator field windings and commutator segments, as indicated in the drawing.

A significant feature of the motor and control system as depicted in FIGURE 3 is the use of an even number of field poles in each stator toroid, with the associated windings or coils being wound and connected for energization with such relative polarity that each field pole of one stator is magnetized oppositely to its neighbors on each side and simultaneously each energized pole on the other stator toroid is magnetized oppositely to its mating pole on the first-mentioned stator. In consequence, with the positioning of the commutator segments as shown in FIGURE 3, which is a typical rest or holding position of the motor, two pairs of field windings are simultaneously being energized so as to establish a very close magnetic coupling through one closed four-pole magnetic loop including the related salient field poles of both stators. This provides a large clamping force to the rotor at the points of contact. Likewise, when the ganged directional control switches 34b1, 34b2, etc., are actuated to either of their drive positions in order to start the load moving in a given direction the field winding energization pattern is shifted. Now the energized pairs of windings include the first two successive pairs which lie next to the existing point of rotor contact on the driving direction side thereof. However, after the motor has moved through a small angle the number of commutator segments connected to the source 30 (through the rotor 20) will change from two to one and will remain at one for an angle of turn somewhat less than one-sixth the circumference in the case of a six-segment commutator. During this increment of rotation only one pair of opposed stator windings will receive full driving current. For example, in FIGURE 3 if it is assumed that the lower group of segments is rolling on rotor 20 in a clockwise direction out of the holding position shown, the instant motion starts, contact with segment 24c6 is lost and contact remains only with segment 24c1, which thereby applies full energizing drive current only through windings 22b2 and 24b2. However, the initial starting-impetus flux does not decay instantly in the originally magnetized pair of poles now losing their magnetizing force, so that carry-over torque is present from these poles also, assisting the windings 22b2 and 24b2 to continue the drive. Thus as the driving motion continues and the number of commutator segments energized alternates between two and one there will be intermittent decays of torque, but the percentage of variation will decrease with increasing speed of motion. However, by utilizing the described four-pole magnetic couple effect, the motor achieves exceedingly high rotor traction and load torque handling capability along with high operating efficiency.

In FIGURE 3 there is provided in each of the bypass connections 34a1, 34a2, etc., a normally closed switch 34g1, 34g2, etc. These switches are ganged together by a mechanical connection 34L by which they may be opened simultaneously in order to eliminate the bypass connections available through actuation of the directional control drive switches 34b1, 34b2, etc.; in other words, to render these latter switches ineffective. However, there is also available an individual bypass connection around each of the switches 34g1, 34g2, namely the respective connections 34j1, 34j2, etc., and in these latter connections there are interposed the normally closed cam-actuated switches 34k1, 34k2, etc. The latter switches carry followers which are selectively engaged by a rotary cam 34m having a lobe 34m' thereon capable of opening the individual switches. This lobe has a sufficient circumferential extent to simultaneously engage at most two of the successively adjacent cam-actuated switches 34k. Consequently, as the cam is rotated it opens one of the switches 34k, then two, then one, etc., in alternating sequence. This rotary cam-operated switch unit therefore provides an index-homing control for the motor by which, as long as the actuator 34d remains actuated to a drive position, the motor will be caused to continue to run until it reaches a selected stopping point established by the position of the rotary position of the cam lobe 34m'. Because of the four-pole magnetic couple feature of the motor the cam-operated switch is preferably designed with suitable detents so that it tends to occupy stopping positions in which two of the switches 34k are simultaneously opened or disengaged.

In operation, when switch 34g is closed, as shown, bypassing the cam-operated switches 34k, primary switches 34b are in complete control of the motor. However, when switch 34g is opened, thereby introducing the index-homing switches 34k into the bypass circuits around the loading resistances 32, the setting of cam lobe 34m' will establish a particular stopping point for the motor. With the control switches 34b in one drive setting, advancement of switch cam 34m in one direction causes step-by-step advance of the motor stators in a corresponding direction, whereas the same direction of advance of cam 34m with the control switches in the opposite drive setting will start the motor stators in a nutation cycle which will terminate (or become foreshortened) each time they reach the instantaneous index-homing position of the cam. In the illustration (FIGURE 3) rotary index-homing switch cam 34m is mechanically interconnected to the directional control actuator 34d such that turning of a crank 34n rotates the cam 34m through a common connecting shaft 34p. Such rotation causes a friction wheel 34q bearing against a clutch surface 34d' of switch actuator 34d to move the actuator in a direction depending upon direction of crank rottion. Actuator movement is limited by stops 34r and 34s, respectively, at positions representing the opposite switching positions of switches 34b. Thus, turning of crank 34n one way or the other moves the actuator out of the hold position and causes the motor to operate in a corresponding direction and to stop when it reaches the index-homing point established by cam lobe 34m'.

For some applications it is desirable to operate the motor to a selected position by remote control utilizing the fewest possible number of connecting wires. While there are different circuit arrangements by which this may be achieved, that illustrated is a simple one. It employs switch 36 interposed serially in one of the conductors 34a1, 34a2, etc., a remote normally open switch 38, and wires 40 connecting the terminals of the latter to the terminals of the former switch. With switch 36 opened, and switches 34b in the reverse or forward drive setting, the motor stators will nutate until they come to the point corresponding to the conductor 34a in which switch 34 is situated. At this point they will stop. Thereupon momentary closure of switch 38, bypassing open switch 36, will initiate another cycle of stator nutation. In this way single nutation cycles of the stators are executed each time switch 28 is momentarily closed, and if the turns ratio of the motor is large each momentary closure of switch 38 will cause an incremental advance of the motor rotor 20 by a small fraction of a revolution.

In the modified control system shown in FIGURE 4 parts and connections which correspond to those in FIGURE 3 are similarly designated. The principal difference embodied in FIGURE 4 is in the revised connections of the stator windings 24b1, 24b2, etc., and 22b1, 22b2, etc., to their respective counterparts and to their energizing circuits. Thus, the electromagnetization polarity of winding 24b1 is reversed in relation to winding 22b1 from what it was in FIGURE 3, and the same is true of the other five windings 24b in relation to their counterparts 22b. Secondly, the commutator segments 24c are connected through loading resistances 32 to the respective windings at the junctions between the opposing stator windings, with the opposite or outer ends of all of the windings 24b on the one stator being connected to the negative side of supply 30. A variable resistance 42 is interposed in the common lead connecting the outer ends of windings 22b on the other stator to the negative side of voltage source 30 as shown.

With this arrangement, energizing drive current flowing through a commutator segment and the corresponding one of conductors 34a1, 34a2, etc., divides at the junction between the corresponding pair of windings 22b and 24b, part flowing downwardly through the winding 24b and the remainder flowing upwardly through the opposing winding 22b, whereupon it divides again at the common junction between the upper ends of the remaining five interconnected windings 22b, so that in returning to the negative side of source 30 one-fifth of it flows downwardly through each of these windings and through the respectively opposing windings 24b connected serially therewith in paired relationship. Resistance 42 acts as a variable bypass for the five parallel-connected pairs of windings, so as to permit increasing or decreasing the amount of current available to be divided five ways between them as previously desscribed. Owing to the connection polarity of the windings the current which is divided between the five pairs of opposing windings generates an effective electromagnetic repulsion force between the toroidal stators at the tilted-apart or back sides of the stators, and this back-side repulsion force acts through leverage on the stators to effectively increase their clamping force. Obviously, means other than the variable resistance 42 may be used in order to vary the relative back-side repulsion force thus generated.

In FIGURE 5, stator 22 has a permeable toroidal core with salient poles each carrying two windings. Thus coils 22b1 and 22a1 are wound on one pole, coils 22b2 and 22a2 on a second pole, etc. The opposing toroidal stator 24 shown schematically as a straight bar, has an equal number of permanent magnet poles 24a1, 24a2, etc. and no windings. Back-side repulsion generally similar to that in FIGURE 4 is provided by connecting the coils of stator 22 in such a manner that any two coils energized simultaneously are wound in an opposite sense and are at opposite sides of the stator toroid (i.e. 180 degrees apart). Thus when coil 22b1 is energized through the commutator with positive polarity for example, so as to attract permanent magnet pole 24a1, coil 22a4 is energized to repel pole 24a4. The setting of resistance 42 controls the intensity of back-side repulsion and the number of poles participating therein. An advantage of providing permanent magnet poles in cooperative relationship with electromagnet poles is to afford clamping and braking of the stator against load force reaction thereon in the event of power failure. Another advantage is that such a motor can hold a load in stationary position for long periods of time without consumption of electric power and without generation of heat due to continued flow of winding current, as in the case of the previously described motor system. The pole magnets 24a1, 24a2, etc., may be made of ordinary steel if desired. However, other materials may be used also, such as a nonconductive ferrite permanent magnet aggregate. The latter has the advantages of insensitivity to vibration and demagnetizing fields and the avoidance of electrical (eddy current) damping of the motor due to shorted-turn effects in the pole structure.

Referring to FIGURES 3, 4 and 5, the functions of switches 34b, 34g and 34k, of the actuator 34d, of stops 34r and 34s, and of friction clutch 34q–34d', may be achieved in a single control device, if desired, such as that depicted in FIGURE 6. In FIGURE 6 parts which correspond closely to those depicted functionally or schematically in FIGURE 3 et seq. are shown with corresponding reference numerals bearing the prefix "1." Thus, crank 134n corresponds to crank 34n, cam 134m corresponds to cam 34m, etc. In this mechanism switch actuator 134d is formed and mounted for rotary movement, whereas the counterpart 34d in FIGURE 3 was shown to be displaceable in a lineal manner; however the function is similar.

The control device of FIGURE 6 has a shaft 134p which is longitudinally shiftable between the illustrated solid-line and dotted-line positions, as are the crank 134n, and cam 134m mounted thereon. Friction wheel 134q, pressed by spring 134u into frictional contact with actuator surface 134d', is keyed to shaft 134p by a key 134v slidable in a longitudinal keyway in the hub of the friction wheel 134q in order to permit longitudinal shaft displacement in any rotated position of the shaft and friction wheel. Stationary pin 134rs mounted in housing end plate 134w is slidably received in an actuator slot 134x the ends of which correspond to the limit stops 34r and 34s in FIGURE 3, for example. Six equally distributed resilient switch arms or blades 134b1, 134b2, etc., are mounted at equal angular spacings on the periphery of actuator 134d. Extending generally parallel to the shaft 134p, these switch arms project lengthwise from actuator 134d and have a radially inward offset permitting their projecting ends to press against the central annular hub of housing end wall 134y. Stationary switch contacts 134f1, 134f2, etc., are mounted at angularly spaced locations on this hub, alternating in positions thereon with similar contacts 134e1, 134e2, etc. There is sufficient spacing between the successively adjacent contacts mounted on the hub so that the contactors 134b1, 134b2 may be moved into intermediate positions wherein they rest on the segments of insulating hub material between contacts 134e and 134f. By turning crank 134n into one limiting position, established by pin 134rs and one end of slot 134x, the contactors 134b1, 134b2, etc., engage the set of contacts 134f1, 134f2, etc., while by turning the crank 134n to the opposite limiting position, likewise established by pin 134rs and the opposite end of slot 134x the contactors will engage the intervening contacts 134e1, 134e2, etc. Actuator 134d is thus rotated by wheel 134q as a result of its frictional engagement therewith.

By moving the actuator crank 134n inwardly to its dotted-line position, the cam 134m is moved into its dotted-line position and its lobe 134m' causes one or two of the contactor arms 134b1, 134b2, etc., to be deflected outwardly from engagement with the stationary contacts 134f or 134e. Thereupon rotation of the crank 134n, one way or the other, causes lifting of the contactors 134b1, 134b2, etc., in successive order out of engagement with the stationary contacts in the manner of the operation of cam 34m in FIGURE 3 et seq.

It will be noted that in the mechanism of FIGURE 6 there is no specific inclusion of components corresponding to the ganged switches 34g1, 34g2, etc., in FIGURE 3 et seq.; however, this is unnecessary inasmuch as with the cam in its retracted, solid-line position in FIGURE 6 it is as if the cam switch mechanism of FIGURE 3 et seq. is altogether omitted from the circuit, so that the function of switch 34g is no longer necessary as such in order to eliminate the effect of the cam-actuated switches 34k, when desired, by closure of all of switches 34g.

In order to prevent slippage or creep between the rotor and the stators, gear teeth may be provided on one or both sides of the rotor which mesh with mating teeth provided on one or both stators, as depicted in FIGURES 7A and 7B. In these figures rotor 20' carries a peripheral gear-flange having a set of peripherally extending teeth 20m' on one side thereof and a similar set 20n' on the opposite side thereof, whereas stator 22 has a peripheral flange carrying a set of gear teeth 22m' meshing with teeth 20m' and stator 24' has a set of teeth 24n' meshing with teeth 20n'. Otherwise, the respective stators and the rotor are or may be substantially the same as in the embodiment depicted in FIGURE 1, for example, and to indicate this point certain parts which correspond to those shown in FIGURE 1 are given similar reference characters. It will be appreciated, of course, that FIGURES 7A and 7B are only fragmentary views and are simplified in that certain parts are omitted from the illustrations.

When gear teeth are employed as, for example, in FIGURE 7, the motor becomes capable of handling high torque through repeating cycles of nutation of the stators and rotation of the rotor with reproducible angular indexing or calibration. By employing a slightly different number of teeth in the stator gears and in the corresponding rotor gears a very high but constant ratio of numbers of nutations of the stators for each revolution of the rotor may be achieved. While the use of serrations or teeth in nutation-type motors is not new, their use in the presently improved motor wherein the rotor is clamped forcibly between nutative stators provides a particular advantage in the ability of the device to maintain the gears in proper mesh despite extreme reaction load torques. Thus, normal gear tooth shapes, having minimum backlash and good wearing properties, may be used even for the greatest of loads. That is, it is not necessary with this improved motor to resort to zero-pressure angle tooth shapes, such as pins mating in straight slots and the like in order to prevent the gears from jumping out of engagement with each other at high torques. As a result it is not necessary to suffer the effects of considerable backlash and wear as is true of previous nutation-type geared motors. Moreover, the rotor, being clamped at a single point between stators, need not be rigid in form in order to maintain the teeth interengaged properly.

The motor of this invention has certain stall properties which may be varied by design. These properties will depend upon permeability and configuration of the field structure including the poles, field coil design and circuitry, permeability of the pinched rotor disk, operating current, rotor and stator conductivity, etc. In one combination, for example, it is possible to achieve high-torque overload response wherein both rotor disk rotation and stator nutation stall or stop when load torque reaches a certain value. Alternatively, it is possible, for example, to design the motor so that the stators will continue to rotate, but they will not turn the rotor due to slippage.

Other characteristics may also be varied by design of the motor. For example, for extremely fast stepping or turning rates at low torques, a thin non-magnetic, non-conducting rotor disk, such as one made of sheet plastic or fiber material, may be used. To achieve higher clamping and torque output characteristics the rotor may be made magnetically permeable. If desired the rotor may be made electrically nonconductive, so that shorted turn or eddy current effects producing back E.M.F. are minimized. Such a result may be achieved by making the rotor disk of iron particles embedded in a plastic, or of a permeable ferrite material. Extreme damping of the response characteristic of the motor may be achieved by making the rotor disk of a highly conductive material such as beryllium-copper or Phosphor bronze alloy so as to produce a marked short-turn effect. A disk made of cold-rolled steel, both magnetically permeable and electrically conductive, produces a median or intermediate behavior characteristic wherein a high degree of clamping pressure is achieved and high torque, combined with a moderate degree of damping. Further, for rugged service at high clamping pressures and torque, with moderately low damping in order to achieve relatively high stepping rates or rapid response characteristics, the rotor disk may be made of wrapped laminated silicon iron, in the form of a wrapped toroid having concentric sleeves of progressively stepped diameters. Preferably in all cases, however, the rotor disk is kept as thin as possible so as to enhance the opposite-pole coupling of the stators in preference to adjacent-pole coupling therebetween magnetically, and so as to maximize torque-to-inertia ratio.

Design of the stator field structure, of course, also has a direct effect on performance characteristics and manufacturing convenience. For example, the use of an integral continuous ring toroid of laminated silicon iron has the advantages of ease of potting the stator in plastic potting compound and precision machineability with strength and rigidity. Electromagnetically, the advantage of a toroidal stator structure with individual pole polarities always the same lies in the ease with which a magnetic field may be built up and stored within the toroid although the external flux pattern is shifted from pole to pole to cause stator nutation. This results in faster response, in only a moderate back E.M.F. being induced in the stator coils, hence reduced commutator arcing and erosion, and in increased electrical efficiency.

Further design considerations relate to the improved contact conditions provided between commutator segments and conducting portions of the disk rotor. Mating contact between these surfaces may be provided in the form of a true rolling contact without appreciable sliding friction therebetween by the design expedient of causing the conical surface of the stators to converge at the respective points of intersection of the adjacent rotor faces and the rotor axis. Alternatively, the surfaces may be made somewhat non-copivotal, or may be set at slight angles relatively, so as to produce a slight scrubbing or sliding motion between the surfaces accompanying rolling contact and thereby maintain the surfaces clean and free of foreign matter. If desired, the conducting portions of the central disk rotor, which are pinched between opposing commutator segments, may be in the form of a continuous annulus, or they may be formed of a series of circumferentially short segments of conductive material embedded in an insulating medium and thereby avoid possible shorting of adjacent commutator segments in the case of a rotor disk which is not fully true.

In the same way, the magnetic pole faces of the toroidal stators desirably present a true conical rolling surface completed by filling in the slots between stator field pole surfaces with suitable potting compound. Alternative to potting, rolling contact continuity is achievable by skewing the otherwise generally radial edges of the salient field poles in like directions circumferentially, and thereby also reduce "magnetic cogging" effects by eliminating those angular increments of roll in which only two (as opposed of four) opposed pole faces are in mating contact simultaneously.

FIGURES 2A and 2B of the above-cited parent patent application Serial No. 350,828 are illustrative of another way of energizing the coils of the stators of the improved motor in pairs of two simultaneously.

Still another embodiment of the improved motor is shown in FIGURES 8, 9, and 10, wherein the rotor is mounted to turn on a stationary shaft and is engaged with an outer casing so as to turn the casing as the opposed stators nutate in rolling contact with the rotor. In this case, the shaft 106 is free to turn through a limited angle by mounting it in a stationary wall 100 by a bushing or bearing 108.

Mounted on this shaft is a pair of circular end plates 112 and 114, these plates being immovably affixed to the shaft by screws 116 threaded in the plates and engaging flats 117 on the shaft. The end plate 112 is perforated as is the bracket 100 to permit wires to be threaded therethrough to feed the coils in the motor shell. The plate 112 has a roller bearing 118 press fit thereon on which, in turn, is press fit a ring 120.

A cylindrical motor shell 122 is affixed to ring 120 by screws 123 and spans the gap between the end plates. The shell has, at the end adjacent end plate 114, an inwardly turned flange 124. A second ball bearing 126 between the end plate 114 and shell flange 124 non-frictionally rotatably supports the shell. The cylindrical shell is provided with a number of slots 128, running parallel to the axis of the shell, here shown as four in number and spaced 90° from each other, these slots being engaged by projections 130, see FIG. 9, of a driven disk 132 firmly embedded in a hub 134 rotatably mounted on shaft 106.

Mounted on the shaft, on each side of disk 132, is a flexible coupling 136. One of the flexible couplings is shown in exploded view in FIG. 10. It comprises a hub or cylindrical body 138, an intermediate circular resilient diaphragm 140 and a cylindrical support body 142. Each hub 138 is adjustably mounted on shaft 106 and fastened thereto by screws 144 in threaded bores 146 on the hubs and bearing against flats 148 on the shaft 106. The body 142 has a large central opening of size sufficient to allow free tilting movement of the body relative to the shaft. The diaphragm 140 has two pairs of diametric holes 150, the holes being spaced 90° from each other, and the bodies 138 and 142 have two pairs of pins 152 located to be positioned in the diaphragm holes and are fastened thereto with the diaphragm spaced from each of the bodies an equal distance. Since the diaphragm is of resilient material and the body or hub 138 is fixed on the shaft, the body 142, by a distortion of the diaphragm, can be operated to a tilting position relative to the shaft. The central aperture in the diaphragm is sufficiently large to allow said tilting movement.

Supported by each of the tiltable bodies 142 is a ring, see FIG. 8, the two rings being indicated as 154 and 156. The rings are spaced from the bodies 142 by spacing and fixing screws 158 threaded through the rings and abutting the bodies 142. The outer surface of each body 142, see FIG. 10, for the purposes of properly locating the screws, is provided with dimples 159.

Supported by each screw 158 is a pole piece 160. In the embodiment shown there are six equally spaced pole pieces within each ring 154 and 156, these pole pieces being directed toward the diaphragm 132. Surrounding each pole piece is a field coil 162, suitable fiber pieces 164 being incorporated in the structure to mechanically protect parts against abrasion and the like.

FIG. 8 illustrated the position of parts when the coils are not energized. When the coils are energized, see FIG. 8, the pole pieces are attracted to the diaphragm 132. Since opposed coils on the two rings are so wound as to present poles of opposite polarity to each other, the opposed pole pieces will also attract each other, when the coils are energized.

Suitable means such as disclosed herein or in the above-cited parent case, are provided to energize adjacent pairs of coils, at will, so as to cause attraction of progressively (or retrogressively) related coils to each other, thus pinching the diaphragm 132 progressively at different circumferential areas of the diaphragm. The action of progressively energizing the pairs of adjacent magnetic coils is to cause the edges of the coils to have a rolling action on the diaphragm in the selected direction, this in turn causing a backward angular movement of the diaphragm, the angular amount of backward movement being a function of the degree of inclination of the rings 154 and 156 toward each other when the coils are energized.

The angularity may be predetermined by adjusting the hubs 138 along the length of the shaft 106. The nearer the hubs 138 are to the diaphragm 132 the more nearly vertical is the attracted position of the coils and the less the backward rotation of the diaphragm as the coils are successively energized. Thus the degree of motion of the diaphragm may be selected irrespective of the fact that the coils are fixedly positioned 60° from each other. It will be noted that because of the teeth or projections 130 on the diaphragm and cooperating slot structure in the shell, angular creeping of the diaphragm will rotationally carry with it the shell 122 and the shell will be angularly displaced relative to the coils. Since the coils are, in effect, fastened to the shaft, relative motion takes place between the shaft and shell. When the shell is held against rotation by the hand, reactive forces will cause the shaft to rotate. Rotation of the shaft under the circumstances will result in restoration of an oscillatory switch (equivalent to the switch 27 shown in the parent application).

The motor has mounted within the shell a commutator switch consisting of a fixed contact carrying portion mounted rigidly on the shaft and rotatable with the shaft, and a nutatable contact carrying portion mounted non-rotatably on the shaft but rotatable with the shaft. The fixed portion, see FIG. 8, comprises two fiber disks 166 and 168, separated from each other by a fiber spacing ring 170, the assemblage being mounted on end plate 114 by screws 172. Mounted on the disk 166 is a spacing rim 173 against which lies a contact carrying disk 174. Each of six equally spaced apart contacts 175 is supported on said disk 174 by being bent in the form of a U-clip embracing said disk and being held to the disk 174 by a screw 176, said screw also passing through a wire terminal 177. The wires connected to these terminals pass through openings in the fiber plates and end plates 114 and correspond in number and function and have connections to coils of the other motor of the pair (as in the case of the commutator segments in FIGS. 2A and 2B in the parent application above cited).

Supported by posts 182 extending from a backing ring 183 fixedly mounted with respect to the coils is a conductive arris edged ring 184. In the attracted position of the coils the ring 184 would press against two fixed contacts 175. As the ring 156 wobbles around, so does the ring 184 causing different ones of the contacts 175 to be shorted together. (The ring 184 functions very much like the shorting bar 74 or 76 in the first-described embodiments of the parent application cited.)

In the further embodiment shown in FIGURE 11, as in a sense is also true of FIGURE 7, magnetic intercoupling of the stators during energization produces a mechanical coupling between the stators and the rotor through surfaces which are not necessarily the magnetic pole face surfaces of the stators. Thus, in FIGURE 11 the pole faces 122a of stator 122 come into direct contact with the pole faces 124a of stator 124 without the rotor disk 120 being interposed physically between them. Instead, the disk is made of lesser radius or is cut away in some other suitable manner, so as to avoid interpositioning thereof between the stator pole faces proper, and the rotor itself is contacted by other surface areas of the stators in order to produce the rolling contact therewith necessary to turn the rotor as the stators nutate. Also, in this case the stator commutator segments 122c contact the opposing commutator segments 124c directly and not through rotor 120. Thus, the electrical properties of the rotor material do not need to satisfy a commutating function, nor do the magnetic permeability properties of the stator need to satisfy any magnetic coupling function of the stator field systems. Thus independence of design parameters is achieved in the modification of FIGURE 11 to a degree beyond that attainable in the preceding embodiments by the technique of actually separating the physical contact areas of rotor and stators which perform the respective functions of magnetic coupling, mechanical traction and commutative electrical coupling, so that those functions may receive independent design consideration suitable to their specific requirements.

These and other aspects of the invention will be evident to those skilled in the art based on an understanding of the foregoing disclosure of the presently preferred embodiments thereof.

I claim as my invention:

1. An electric motor comprising a rotor mounted to turn on an axis, stator means including mutually opposed stator members mounted on said axis, with the rotor interposed between them to permit physical contact with both, both of said stator members being nutative in a universal sense and the rotor being cooperatively related thereto so as to permit pinching of the rotor between stator members at any of different points angularly distributed about the axis, said stator means further comprising a plurality of magnetic flux paths passing through the stator members serially and bridging between them to attract them together at any of different angularly spaced magnetic pole locations selectable in accordance with the selection of windings to be energized, thereby to permit pinching the rotor between stator members at any of different points corresponding in angular position to said pole locations, and electrical connection means for said windings permitting selective energization thereof to change the angular position of attraction between stator members and thereby of the point of pinching of the rotor therebetween.

2. The electric motor defined in claim 1, and holding means associated with at least one of the stator members and operable for maintaining residual magnetic attraction flux therein for holding the rotor pinched between stator members at any of said pinching locations established by field winding energization.

3. The electric motor defined in claim 1, wherein the rotor comprises a thin disk-like member opposite faces of which are substantially flat, and wherein the nutative stator member has a generally conical surface which contacts the rotor face adjacent thereto.

4. The electrical motor defined in claim 1, wherein the stator members are pivotally mounted each for nodding about a plurality of axes which intersect at a common point located in the vicinity of the center of mass of the member, and both stator members have a like plurality of poles and associated windings which correspond.

5. The electric motor defined in claim 1, wherein the electrical connection means comprises commutator means having opposing parts, one part including a series of segments electrically connected respectively to different field windings and the other part including contact means engageable by the segments, one such part being physically connected with the nutative stator member to move therewith, and the other part being adapted to engage the segments in successive order during such movement.

6. The electric motor defined in claim 5, wherein there are an even number of windings individually connected to their respective segments with alternately opposite polarities so that magnetization of each pole always occurs with the same polarity and with a polarity opposite that of the next adjacent poles in the structure.

7. The electric motor defined in claim 6, wherein both stator members have a like number of windings and have magnetically permeable structures defining a like number of separate poles at like angular spacings about the axis, said individual windings of one stator member being electrically connected in circuit with the respective individual windings of the other stator member and with relatively opposite polarity so as to cooperate mutually therewith in production of magnetizing forces.

8. The electric motor defined in claim 1, wherein both stator members are similarly nutative and the effective center of nutation of each stator member is located in the vicinity of its center of mass and wherein the respective polar moments of inertia of the stator members about their nutation centers are substantially equal, so as to balance the motor dynamically.

9. The electric motor defined in claim 8, wherein the electrical connection means includes for each winding a first current path for supplying a relatively small holding current to the winding, a second current path for supplying a relatively large driving current to the winding, and switch means connected with such windings and commutator segments for selectively opening and closing the driving current paths of the windings, said commutator segments being mounted in angular positional registry with their respectively associated windings and being connected thereto through their corresponding holding current paths, thereby tending to maintain any given nutative positioning of the associated stator member with the rotor held pinched between stator members, whereas the driving current paths are respectively connected between such segments and the next angularly adjacent windings.

10. The electric motor defined in claim 9, wherein the electrical connection means further includes circuit means interconnecting the windings of one stator member so that energization of one such winding with driving current is accompanied by energization of at least one other such winding with current of a polarity which is repulsive to the corresponding pole of the other stator member, thereby to increase the pinch effect.

11. The electric motor defined in claim 10, wherein one end of each winding of one stator member is connected to one end of a corresponding winding of the other stator member and to a commutator segment, a first energization terminal commonly connected to the opposite ends of the windings of one stator member, and a second energization terminal commonly connected to the opposite ends of the windings of the other stator member.

12. The electric motor defined in claim 9, wherein the switch means includes separate normally open sets of contacts for the respective driving current paths, said sets of contacts being adapted for conjoint operation to the closed condition for producing continuing motor drive during such condition.

13. The electric motor defined in claim 12, wherein the switch means further includes separate normally closed sets of contacts in the respective driving current paths, and index-homing means for selectively opening said latter sets individually for terminating motor drive at a corresponding stator nutative position.

14. The electric motor defined in claim 2, wherein the holding means comprises a permanent magnet means incorporated in at least one of the stator members to provide permanent magnetization flux in each of said poles contacted.

15. An electric motor comprising a rotor mounted to turn on an axis, mutually opposed stator members mounted on said axis with the rotor interposed between them to permit physical contact with both, both of said stator members being nutative in a universal sense to permit pinching of the rotor between stator members at any of different corresponding points angularly distributed about the axis, both the stator members having a corresponding plurality of magnetic field windings and related magnetically permeable structure defining separate poles similarly spaced angularly about said axis and adapted to pass magnetic attraction flux through the other stator member at each of mutually opposing poles of the stator members, and electrical connection means for said windings permitting selective energization thereof to change the angular position of attraction betwen stator members and thereby of the point of pinching of the rotor therebetween.

16. The electric motor defined in claim 15, wherein each stator member comprising a magnetically permeable ring-like member having a substantially convex-conical side facing the rotor, with angularly spaced recesses formed in the permeable material defining a succession of salient poles.

17. The electric motor defined in claim 16, wherein the electrical connection means comprises commutator means having opposing parts, one part including a series of segments electrically connected respectively to different field windings and the other part including contact means engageable by the segments, one such part being physically connected with the nutative stator member to move therewith, and the other part being adapted to engage the segments in successive order during such movement, each stator member having an even number of windings individually connected to their respective segments with alternately opposite polarities so that magnetization of each pole and each portion of the stator structures always occurs with the same polarity and with a polarity opposite that of the next adjacent poles in the structure.

18. An electric motor comprising a rotor mounted to turn on an axis, mutually opposed stator members mounted on said axis with the rotor interposed between them to permit physical contact with both, both of said stator members being nutative in a universal sense and the rotor and other stator being cooperatively related thereto so as to permit pinching of the rotor between stator members at any of different corresponding points angularly distributed about the axis, at least one of the stator members having a plurality of magnetic field windings and related magnetically permeable structure defining separate poles spaced angularly about said axis and adapted to pass magnetic attraction flux through the other stator member at each such pole, said other stator member comprising magnetically permeable material to carry such flux and electrical connection means for said windings permitting selective energization thereof to change the angular position of attraction between stator members and thereby of the point of pinching of the rotor therebetween, said rotor having gear teeth on both sides thereof, and both of the stator members having gear teeth meshing with the respectively adjacent rotor teeth, the number of teeth on each stator member differing from the number of teeth on the respectively adjacent side of the rotor by a small fraction of the latter number.

19. An electric motor comprising a rotor mounted to turn on an axis, mutually opposed stator members mounted on said axis with the rotor interposed between them to permit physical contact with both, both of said stator members being nutative in a universal sense and the rotor and other stator being cooperatively related thereto so as to permit pinching of the rotor between stator members at any of different corresponding points angularly distributed about the axis, at least one of the stator members having a plurality of magnetic field windings and related magnetically permeable structure defining separate poles spaced angularly about said axis and adapted to pass magnetic attraction flux through the other stator member at each such pole, said other stator member comprising magnetically permeable material to carry such flux and electrical connection means for said windings permitting selective energization thereof to change the angular position of attraction between stator members and thereby of the point of pinching of the rotor therebetween, the connection means further including circuit means interconnecting the windings of one stator member so that energization of one such winding with driving current is accompanied by energization of at least one other such winding with current of a polarity which is repulsive to the corresponding pole of the other stator member, thereby to increase the pinch effect.

20. An electric motor comprising a rotor interposed between two axially separated nutative stators coaxially mounted adjacent opposite sides of the rotor and adapted for making rolling contact with the respective rotor sides at corresponding angular positions, said stators comprising ferromagnetic material adapted to carry magnetic flux which passes through both stators, electromagnetic means for magnetizing the stators at a selected effective angular position for drawing them simultaneously into such rolling contact at the angular location of flux passing directly between the stators, and associated circuit means for rotatively shifting the effective angular position of such magnetization.

References Cited

UNITED STATES PATENTS

| Re. 22,549 | 8/1944 | Plensler | 310—82 |
| 1,495,784 | 5/1924 | Fereday | 310—82 |
| 2,866,110 | 12/1958 | Schon | 310—82 |
| 2,871,382 | 1/1959 | Bouvier | 310—82 |
| 3,117,244 | 1/1964 | Rosain et al. | 310—82 |
| 3,249,776 | 5/1966 | Anderson | 310—82 |

FOREIGN PATENTS 902,883   7/1949   Germany.

MILTON O. HIRSHFIELD, *Primary Examiner.*

J. D. MILLER, *Assistant Examiner.*